United States Patent [19]

Georgopulos

[11] 4,049,227

[45] Sept. 20, 1977

[54] MOUNTING ARRANGEMENT FOR ELECTRICAL COMPONENTS AND ELECTRICAL COMPONENT CASES ADAPTED TO BE USED THEREWITH

[75] Inventor: Thomas Georgopulos, Chicago, Ill.

[73] Assignee: GTE Automatic Electric Laboratories Incorporated, Northlake, Ill.

[21] Appl. No.: 676,780

[22] Filed: Apr. 14, 1976

Related U.S. Application Data

[63] Continuation of Ser. No. 393,267, Aug. 30, 1973, abandoned.

[51] Int. Cl.$^2$ .............................................. A47F 5/00
[52] U.S. Cl. .............................. 248/309 R; 339/17 C; 361/401
[58] Field of Search .................. 248/309, 310; 211/71, 211/72, 73; 361/401, 412, 414, 42 D; 339/17 C, 17 N, 198; 220/298; 200/296

[56] References Cited

U.S. PATENT DOCUMENTS

| 2,793,354 | 5/1957 | Heimbach | 317/99 |
| 3,152,853 | 10/1964 | Scott | 339/220 |
| 3,488,628 | 1/1970 | Lundergan et al. | 339/258 |
| 3,710,196 | 1/1973 | Fifield | 317/101 CC |
| 3,754,245 | 8/1973 | Peprnik | 340/381 |

Primary Examiner—Robert A. Hafer

[57] ABSTRACT

This invention relates to mounting blocks for receiving electrical components encased in individual cases. The mounting blocks include a plurality of openings and the electrical component containers include a pair of tabs which are adapted to releasably hold the cases on the mounting block. A binding post module is also disclosed for use with the mounting block, the binding post module also including a pair of tabs which allow the module to be releasably engaged with the apertures in the mounting blocks.

5 Claims, 3 Drawing Figures

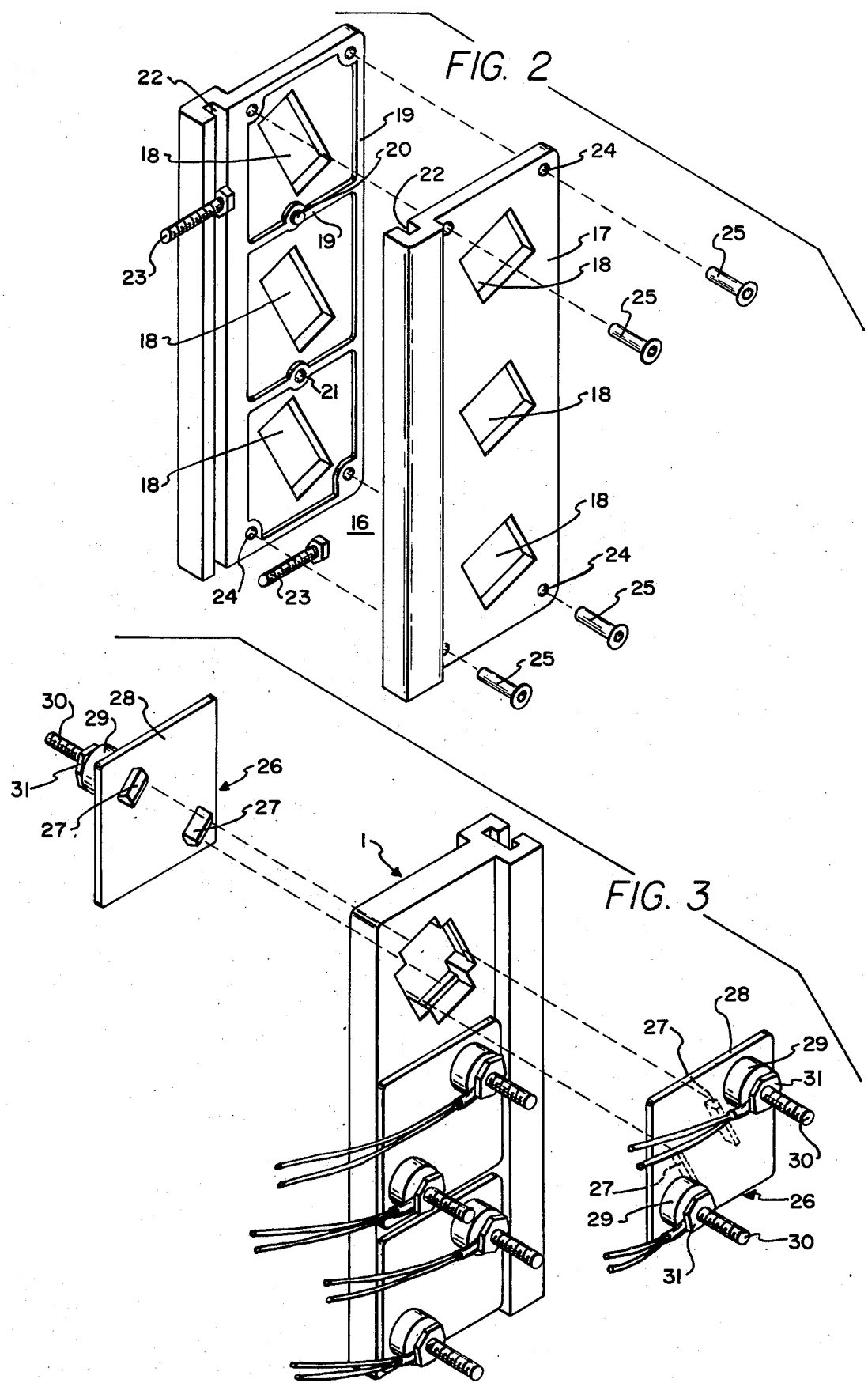

MOUNTING ARRANGEMENT FOR ELECTRICAL COMPONENTS AND ELECTRICAL COMPONENT CASES ADAPTED TO BE USED THEREWITH

This is a continuation of co-pending application Ser. No. 393,267, filed Aug. 30, 1973, now abandoned.

BACKGROUND OF THE INVENTION

This invention relates generally to mounting arrangements for releasably holding electrical components contained in individual cases to a mounting block, and more particularly the invention is related to mounting blocks useful for holding any number of loading coils encased in individual cases.

U.S. Pat. No. 2,692,302 issued to A. E. Graves on Oct. 19, 1954 and U.S. Pat. No. 3,691,294 issued to Joseph T. Charles on Sept. 12, 1972 illustrate two prior art mounting arrangements for holding individual electrical components. The Charles patent deals with a case for enclosing loading coils typically used in telecommunications systems, however it is has certain disadvantages in that the coils must be mounted such that the leads therefrom exit the case from only one angle. In the present invention the mounting blocks and the electrical cases for use with the mounting blocks have specifically been designed to allow the cases to be installed and in a fashion such that the lead outs may come to the front or the rear of the mounting block. Hence when the mounting block is used in a location with limited access to the rear of the mounting block, all the cases may be inserted such that the leads will come out toward the front or if the mounting space is not particularly cramped, some of the cases may be oriented such that the leads will come out toward the rear of the mounting blocks.

SUMMARY OF THE INVENTION

In the present invention mounting blocks are provided which include a plurality of generally rectangular, spaced apart openings which are adapted to receive electrical component cases having a spaced apart pair of integral tabs thereon. The mounting block includes the C-shaped channel into which mounting bolts may be inserted to attach the block to a suitable mounting standard. In instances in which the mounting block may be desired to be used for terminating in common electrical conductors, a special binding post module is provided which may be releasably snapped into mounting block. The releasable snapping arrangement between the component cases and the mounting blocks allow any desired number of cases to be inserted into the blocks.

Another feature of the present invention resides in the fact that the generally rectangular apertures in the mounting block are oriented at 45° from the longitudinal axis of the block and also are orientated in criss-cross pairs so that the component containers may be placed back-to-back on opposite sides of the block. In addition, the retaining tabs on the cases are also orientated at an angle such that the combination of the angular orientation of the retaining tabs and the rectangular slots on the mounting blocks allow the electrical cases to be snapped into the mounting blocks such that the electrical leads from the cases may either face forward or rearward as the user desires.

An alternative mounting block is also shown which is constructed of two symmetrical half sections. Each of the half sections includes a series of generally rectangularly shaped openings adapted to receive the electrical cases.

BRIEF DESCRIPTION OF THE DRAWING

FIG. 2 is the perspective view of a second embodiment of the mounting block of the present invention.

FIG. 3 is a perspective view of the mounting block of FIG. 1 in which the binding post module of present invention is illustrated both in the snapped-in and spaced apart relationship with the mounting block.

DESCRIPTION OF THE PREFERRED EMBODIMENT

Figure 1:
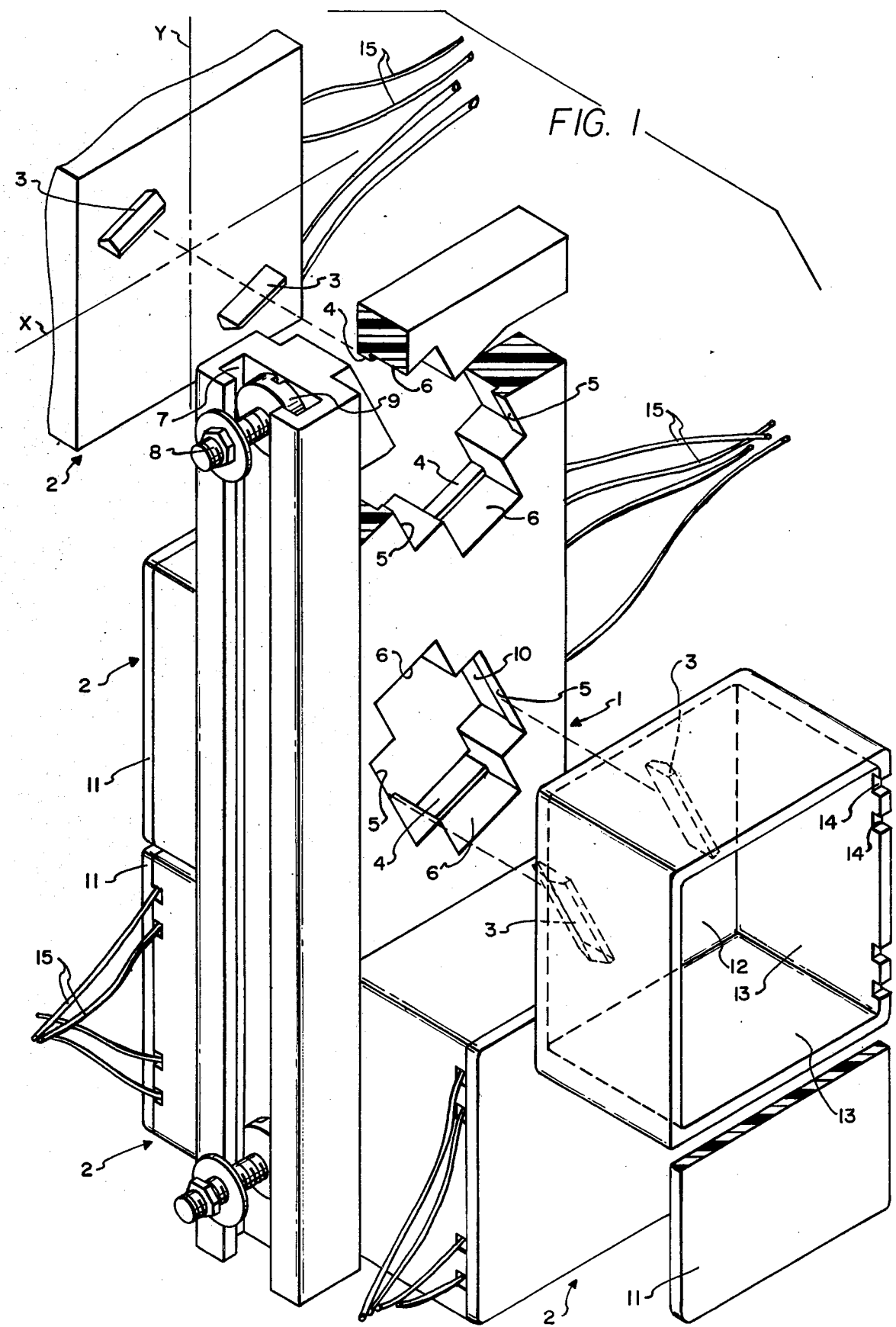
FIG. 1 is an enlarged perspective view of one embodiment of the mounting block of the present invention with some electrical cases snapped into place and other electrical cases spaced apart from the mounting block.

Now referring to FIG. 1, there is illustrated mounting block 1 shown in an enlarged perspective view with the top portion of the block broken away to better illustrate the detail with respect to the openings for receiving mounting tabs of the cases for the electrical components. The electrical component cases 2 are shown with relationship to the mounting block 1, some of the cases 2 being snapped into place on the block and others shown in the spaced apart relationship of mounting block 1 to illustrate how retaining tabs 3 will fit into the openings of mounting block 1. In the particular arrangement of mounting block 1 shown in FIG. 1, referring to the component case 2 in the upper left hand portion of the figure, retaining tabs 3 of the component case 2 will snap into one aperture in mounting block 1 and be held into place by a pair of ridges 4 in mounting block 1. A second pair of ridges 5 are located near the opposite side of mounting block 1 and are oriented at an angle of approximately 90° from the first pair of ridges 4. The pairs of ridges 4 and 5 are formed by first producing generally rectangular openings through the mounting block 1, those openings being oriented at 90° from each other and each oriented at an angle of 45° from the longitude and axis of block 1. Next, each end of the openings is slightly enlarged part way through block 1 to leave the first pair of ridges 4 adjacent to one side of mounting block 1 and the second pair of ridges 5 adjacent to the opposite side of mounting block 1. The pair of openings which make up the criss-cross pair at each location of the block may be viewed as generally rectangular and having an increased dimension part way through the block which forms a base area 6, for example, for the first pair of ridges 4 associated with generally rectangular opening. In a like manner, the second generally rectangular opening yields ridges 5 and base areas 10 associated therewith. With the criss-cross arrangement of the openings in the mounting block 1, one component case 2 may be inserted as shown in the upper left hand corner of the figure and retaining tabs 3 will snap into mounting block 1 with ridges 4 holding the retaining tabs 3 into place and hence holding case 2 onto the mounting block 1. As shown in FIG. 1, when the upper left hand component case 2 has been snapped into place, retaining tabs 3 will extend inward from the associated ridges 4 and come to rest adjacent base areas 6.

The center criss-cross opening in the mounting block 1 illustrates how the retaining tabs 3 fits into the space adjacent base area 6, since a component case 2 has been snapped into mounting block 1 from opposite side and is being retained in this position by retaining tab 3. Component case 2 adjacent to the middle opening of mounting block 1 and spaced apart from the center opening, has the retaining tabs 3 shown in dotted line relationship to illustrate how this second component case 2 may be snapped into the mounting block 1 and held into place by virtue of the second pair of ridges 5 adjacent to the near side of mounting block 1. Thus it will be appreciated that with a criss-cross arrangement of openings in the mounting block with the corresponding pair or ridges associated with each of the openings, a component case 2 may be mounted from either side and two cases mounted in the same area but on opposite sides of the block at the same time.

One of the unique features of the mounting arrangement of the present invention is that the cases 2 may be snapped into the mounting block 1 with the electrical leads facing either forward or rearward. Furthermore, this may be accomplished with for example the cases on opposite sides of the block occupying the same general location, one case having its leads facing forward and the other facing to the rear. This unique advantage is accomplished by first having the pair of rectangular openings in the mounting block 1 arranged such that each of the openings, and hence the ridges 4 and 5, oriented at an angle of 45° from the longitudinal axis of the block 1. Also, on component cases 2 it will be noted that retaining tabs 3 are rotated at an angle of approximately 45° from the X and Y axis of component case 2. Thus, with leads 15 extending from component case 2 in a line along the X axis, as viewed in FIG. 1, case 2 in the upper left hand corner of the figure be snapped into mounting block 1 oriented as shown in the figure. Another case 2 may then be installed on the opposite side of block 1 in the upper most opening with its electrical leads 15 extending either forward or rearward. To visualize this, if it is desired to have leads 15 of a second case 2 extend outward, toward the front of mounting block 1; then this second case 2 would be oriented in the manner that case 2 with top 11 open is illustrated and then be snapped in such that retaining tabs 3 would intersect with the second pair of ridges 5. With respect to the upper left hand case 2, this could be visualized by rotating that case 2 180° about the X axis which would result in retaining tabs 3 falling into the same relative position as those of case 2 in the near side of figure toward the middle of mounting block 1. To mount a case with the leads leading to the rear of mounting block 1, this can be visualized by looking at case 2 in the upper left hand corner of the figure and with a case in this relative position rotating it 180° about the Y axis which would result in a leads 15 exiting toward the rear of the mounting block 1 and retaining tabs 3 falling into position to snap into the second pair of ridges 5. Thus from the foregoing it will be appreciated that with the particular arrangement if mounting block 1 and cases 2, cases 2 may be oriented so that all the leads come out toward the front of the block or the rear of the block 1 or in any alternative fashion with some toward the front and some toward the rear.

Mounting block 1 includes a channel 7 along the rear edge thereof, this channel providing a means to hold mounting means to secure the block 1 to a mounting standard, as shown in FIG. 1, one anticipated arrangement would be to add to the mounting block a bolt 8 having a head 9 adapted fit within the channel 7. With this arrangement, the bolts may be moved to fit into desired mounting holes in a mounting standard and the block held into place by attaching a suitable nut or other fastening means to the bolt 8.

Referring to FIG. 1, a better view of component case 2 is illustrated in the right hand portion thereof wherein one of the cases 2 is shown with its top 11 removed, with a portion of the top 11 cut away to reveal the interior of case 2. Case 2 principally comprises a floor 12 with integrally molded retaining tabs 3 and sidewall portions 13 which rise upward from floor 12. To facilitate emergence of electrical leads from the case 2, a plurality of notches 14 have been added to the sidewall along one edge. In the preferred embodiment, case 2 is molded of a resilient, thermo plastic material, this material being sufficiently resilient to allow retaining tabs 3 to flex when they are pressed into place in the openings. When case 2 is used to hold a loading coil, the loading coil would be placed into the case with the leads extending out through notches 14. Next the case would be filled with an epoxy type of material to hermetically seal the loading coil and prevent its deterioration from temperature and humidity affects. Finally, top 11 would be placed over case 2 and cemented into place with a suitable adhesive.

Now referring to FIG. 2, there is illustrated a mounting block assembly 16 in accordance with the present invention. Mounting block assembly 16 is composed of a pair of symmetrical half sections 17 including a plurality of generally rectangularly shaped openings 18. It will be noted that openings 18 are oriented at an angle of approximately 45° from the longitudinal axis of half sections 17. In order to allow the retaining tabs to snap through the openings 18 and not interfere with the opposite half section 17, each half section 17 includes a rib portion 19 which extends around the perimeter of the half section and transversely across each half section 17. With these ribs 19 on each half section 17, a space is provided so that the tips of retaining tabs 3 will not interfere with the opposite half section. It will also be noted that a pin 20 is included in the upper transverse rib 19 and a socket 21 is included in the lower of the two transverse cross ribs 19 so that when the two half sections are placed together the pin and socket arrangement provide for properly aligning the symmetrical half section 17. Each of the symmetrical half sections 17 also include a channel 22 for receiving the head of a suitable mounting means such as bolts 23 so that when the mounting block assembly 16 is fastened together, bolts 23 may serve to support mounting block 16 on a suitable mounting standard. Each of the symmetrical half sections 17 includes a plurality of apertures 24 through which suitable fastening means, such as rivets 25, may be passed to secure the two half sections together. When assembled, the mounting block assembly 16 performs the same functions and cooperates with cases 2 to provide a mounting arrangement for holding any number of component cases 2 as illustrated in FIG. 1.

An alternative construction for the mounting arrangement of the present invention is specifically contemplated in which mounting block 1 and symmetrical half sections 17 are made from a resilient material. Cases 2, and hence the integral retaining tabs 3, would then be constructed from a relatively rigid material. With this material combination, the mounting block 1, or half section 17, would flex upon snapping case 2 into the opening rather than having retaining tabs 3 primarily flexing upon insertion.

Now referring to FIG. 3, there is illustrated a binding post module 26 adapted to be releasably snapped into mounting block 1. Modules 26 include a pair of retaining tabs 27 in a spaced apart relationship which are adapted to be received by mounting block 1 or mounting block 16. Retaining tabs 27 are molded as an integral part of module 26 and extend from the base portion 28 of module 26. On the opposite side of base portion 28 from which the retaining tabs 27 are located a pair of integrally molded upstanding posts 29 extending from base portion 28, posts 29 including electrically conducting screw terminals 30 molded as a part thereof. To provide a post for electrical connection a threaded nut 31 may be added to secure the electrical conductors to the screw terminal 30. It should be noted that the retaining tabs 27 are positioned on the binding post module 26 in the same relationship with respect to the overall module as the retaining tabs 3 are with respect to the component cases 2, and thus a multiplicity of alignment arrangements may be provided between the binding post module 26 and the mounting blocks 1 or 16.

What is claimed is:

1. A mounting arrangement for facilitating the mounting of component cases having projecting retaining tabs comprising:
    an elongated mounting block having a longitudinal axis, being of a predetermined substantial thickness, and having front and rear major surfaces;
    a plurality of openings arranged in longitudinal spaced relation in said block, each said opening defined by intersecting rectangular cut out portion parts of substantially equal dimension, wherein the longitudinal axis of each said rectangular cut out portion is substantially 45° relative to said block longitudinal axis, and wherein the longitudinal axis of each rectangular cut out portion pair are substantially at right angles and bisecting each other; and
    a first pair of mounting ridges along the minimum dimension sides of a given one of each said rectangular cut out portion pairs, said first pair of mounting ridges being immediately adjacent one of said major surfaces and being relatively thin in cross sectional thickness relative to said predetermined substantial thickness of said block, and a second pair of mounting ridges along the minimum dimension sides of the other one of each said rectangular cut out portion pairs, said second pair of mounting ridges being immediately adjacent the other one of said major surfaces and being relatively thin in cross sectional thickness relative to said predetermined substantial thickness of said block, whereby, the first and second pairs of mounting ridges of each said opening are oriented substantiallly at right angles to one another and arranged for independently receiving cooperating retaining tabs carried by component cases to be mounted on said block to facilitate the external mounting of such component cases to both major surfaces of said block.

2. A mounting arrangement in accordance with claim 1 wherein the combined cross sectional thickness of said first and second pairs of mounting ridges is less than said predetermined substantial thickness of said block to thereby render said first and second pairs of mounting ridges spaced apart transversely relative to said major surfaces of said block.

3. A mounting arrangemment in accordance with claim 1 wherein said openings are aligned and arranged parallel to said longitudinal axis of said mounting block.

4. A mounting arrangement for facilitating the mounting of component cases having projecting retaining tabs comprising:
    an elongated mounting block comprising a first half section having a longitudinal axis, an outer major surface, and a plurality rectangular openings, said rectangular openings having longitudinal axis arranged in parallel relation and substantially 45° relative to and to one side of said first half section longitudinal axis, a second half section having an outer major surface facing opposite said first half section major surface, and a plurality of rectangular openings, said second half section rectangular openings being of the same dimension as said first half section rectangular openings and arranged relative to said first half section rectangular openings to thereby form intersecting rectangular opening pairs having longitudinal axis at substantially right angles and bisecting each other;
    means for securing said first and second half section together with said major surfaces facing outwardly; and
    a plurality of ribs carried by at least one of said half sections for transversely spacing said half sections relative to said major surfaces when said half sections are secured together; whereby,
    with said half sections secured together and spaced apart, the minor dimension sides of each of said rectangular openings are arranged for independently receiving cooperating retaining tabs carried by component cases to be mounted on said block to facilitate the external mounting of such component cases to both of said major surfaces.

5. A mounting arrangement in accordance with claim 4 wherein each said half section includes a channel, said channels being arranged to face each other when said half sections are secured together for receiving support means for supporting said block.

* * * * *

UNITED STATES PATENT AND TRADEMARK OFFICE
CERTIFICATE OF CORRECTION

PATENT NO. : 4,049,227
DATED : September 20, 1977
INVENTOR(S) : Thomas Georgopulos It is certified that error appears in the above-identified patent and that said Letters Patent are hereby corrected as shown below:

Column 5, line 30, "parts" should be --pairs--

Signed and Sealed this

Twentieth Day of December 1977

[SEAL]

Attest:

RUTH C. MASON
Attesting Officer

LUTRELLE F. PARKER
Acting Commissioner of Patents and Trademarks